Dec. 27, 1927.
A. A. McCREE
1,653,650
VALVE
Filed Sept. 11, 1925
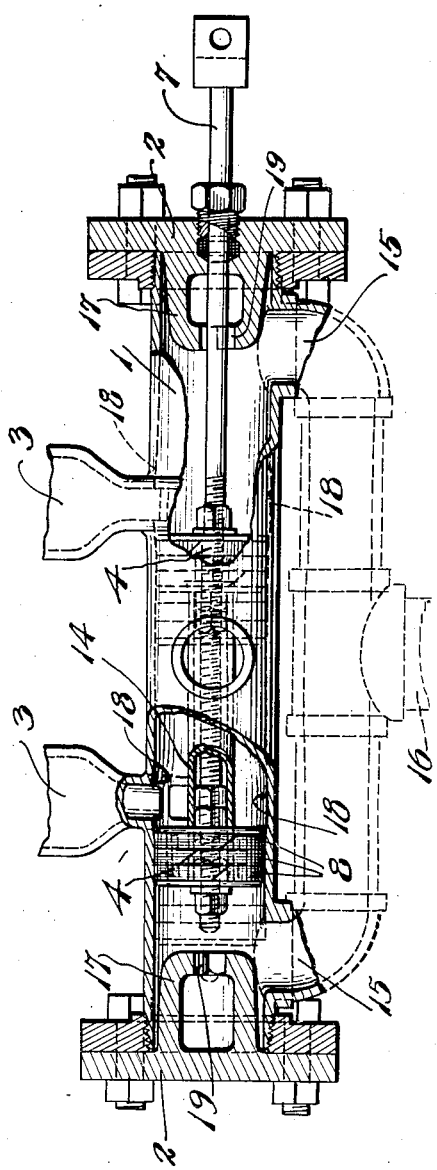
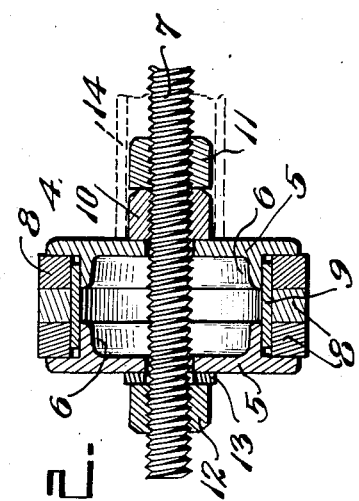
Inventor
A.A. McCree Patented Dec. 27, 1927.

1,653,650

UNITED STATES PATENT OFFICE.

ANDREW A. McCREE, OF ST. PAUL, MINNESOTA.

VALVE.

Application filed September 11, 1925. Serial No. 55,748.

This invention has to do with valve devices, and principally with that type of valve mechanism utilizing a piston valve structure.

The essential and important feature of my invention has been to design a valve of the class referred to embodying suitable packing for preventing a fluid controlled thereby from passing the same, which packing is adapted to be compressed in the direction of travel of the valve so as to expand the same for the purpose of tightening the valve in the valve casing provided therefor. In this way, I am enabled to take up looseness incident to wear of the valve under usage and prevent leakage.

Still another important feature of my invention has been to devise provisions whereby the tightening of the valve against its casing may be effected without removing any part of the casing or the valve itself, or necessitating the shutting off of the fluid which passes through the casing by the valve. To this particular end I utilize a special form of member on the casing, into cooperation with which a screw nut upon the stem or rod of the valve may be brought, by simply giving the valve a certain amount of extra movement in its casing. With the parts cooperating as just mentioned, I am enabled to move the nut into cooperation with the casing member or part, the latter acting after the manner of a wrench, so that the packing may be adjusted for the purpose above mentioned.

Still another feature of the invention is involved in the construction of the cylinder or casing in which my valve, or valves of the type of my invention, operate. The valve is intended to move in the casing opposite to or across an inlet port or ports provided in a wall of the casing. For the above reason, as the valve involves the use of packing, I have enlarged the bore of the casing at said inlet port or ports. The enlarged portion of the bore tapers slightly in opposite directions from the port. The foregoing structure results in a relieving of the pressure of the cylinder or casing wall on the packing as the packing reaches or moves across the port while the packing is maintained in contact with the casing at said enlarged part of the bore, and in this way wear on the packing is reduced.

Referring to the accompanying drawings:

Figure 1 is a general side view of a valve mechanism embodying the valve and casing structure in accordance with the invention, portions of the casing being broken away, and the end heads of the casing shown in section to illustrate more fully enclosed features of the valve device.

Figure 2 is a sectional view of one of the valves embodying my invention and the valve stem connected therewith.

In the carrying out of the present invention, and in this connection reference is made particularly to the drawings for the preferred embodiment thereof, it will be seen that I employ a valve casing 1 equipped with removable ends or heads 2, the said casing being provided with fluid supply ports 3 leading into the same at the side thereof. The ports 3 provide communication between the casing 1 and two sources of supply of a fluid such as water, the movement of which will be controlled by the valve mechanism of this invention.

Mounted in the casing 1 are the two valves 4 which are of like construction and each of which constitutes the improved valve construction certain advantages of which have been hereinbefore referred to. Since the valves 4 are alike, a single one of these valves may be referred to in setting forth its detail construction, and in this connection reference is made to Figure 2 showing the valve 4 alone, in section. The valve 4 is of piston-like construction, generally speaking, and comprises two heads or disks 5 having the inwardly extending annular flanges 6 and adapted to be loosely mounted upon a stem or rod 7 by which the valve is to be actuated.

Between the disks 5 there are provided one or more packing members 8, three being illustrated in the present case and each shown in Figure 1 to have beveled meeting ends providing an overlap at said portions of the member. The packing members 8 are clamped between the disks 5 and they are preferably seated upon a single packing member 9 which spans the space between the disks 5, being of a width, however, less than the said space in order that the disks 5 may be moved toward one another to increase their compression upon the packing members 8 and cause these packing members to expand slightly for the purpose of tightening the same against the inner wall of the valve casing 1. In this way wear on the valve may be taken up and leakage prevented between the valve and the casing.

The packing member 9 between the disks 5 is seated on the flanges 6 of the disks and prevented from inward displacement by said flanges, which perform the same function in relation to the packing members 8 through the intermediary of the member 9. Upon the stem or rod 7 of the valve, which is a screw rod, is mounted the abutment nut 10, the clamping nut 11, and the adjusting nut 12, the latter being located at the side of the valve adjacent to the end member 2, and the nuts 10 and 11 being located at the inner side of the valve, so to speak. Between the nut 12 and the adjacent disk 6 which it is intended to move, may be interposed a spring lock washer 13. When two valves 4 are employed I preferably interpose between the two valves a tubular stop or abutment member 14 seen best in Figure 1, the same surrounding the inner abutment and clamping nuts 10 and 11 secured on the rod between said valves.

It is of course to be understood that my invention is useful in many ways by the employment of a single one of the valves and I have only illustrated the adaptation of the valve construction as herein because it represents an actual embodiment of my invention where the use of the valve has proved advantageous.

By the tightening up of the nut 12 it is evident that the adjacent disk 5 may be forced toward the opposing disk 5 and the packing members 8 compressed as desired or required to tighten them against the walls of the cylinder and eliminate any leakage, or possibility of leakage, of the fluid passing into the cylinder or casing 1, past the valves at the points where they engage said casing.

The casing 1 may have the outlet ports 15 leading to a common outlet pipe 16, as illustrated in dotted lines in Figure 1.

As a novel and convenient method of tightening the packing members 8 against the casing wall in which the valve 4 operates I preferably utilize wrench abutments 17 which are integral extensions of the end members 2 projecting inwardly therefrom into the casing 1. Each of the wrench abutments 17 is provided with an opening 19 or socket to receive an adjacent one of the adjusting nuts 12, when the rod 7 is moved sufficiently far to produce engagement between said parts. Obviously when once a nut 12 has been engaged with the socket 19 of a wrench abutment 17, by applying a suitable tool to the stem 7 it may be readily turned, the nut 12 remaining stationary, thereby producing a screwing effect of the nut on the stem or rod 7 advancing the nut 12 toward the disk 5 adjacent thereto. The desirability of having a tightening means for the packing members 8 such as just described will almost be self evident. By the use thereof it is unnecessary to open the casing 1 at all for access to the valves. Therefore it is unnecessary to shut off the supply of fluid or liquid to the valve casing 1 as customary when replacements or adjustments of valves in casings are being attended to. Moreover, of course the valves need not be removed from the casings and the desired operation of taking up wear on the valves may be performed very quickly and almost on a moment's notice.

As previously mentioned, the bore of the casing 1 adjacent to the point where the port 3 communicates therewith is slightly enlarged as shown at 18, the enlarged portion of the bore tapering, practically speaking, from the point of location of the port in opposite directions therefrom. By using these enlarged portions the pressure incident to friction of the packing members 8 on the walls of the casing adjacent the port 3 is somewhat relieved as the valve 4 passes the port 3, and in this way wear on the packing 8 is reduced and there is no tendency to dislodge the packing owing to its expansion and engagement with a sharp shoulder or similar part of the valve casing.

Having thus described my invention, what I claim as new and desire to secure by Letters Patent is:

1. A piston type valve consisting of an actuating rod screw-threaded in one direction, an abutment threaded upon said rod and held from movement relative thereto, an inner disk loosely mounted in contact with said abutment, an outer disk, packing means disposed between said disks, and an adjustable member threaded upon the rod to engage the outer disk and compress the packing to compensate for wear.

2. A piston type valve consisting of an actuating rod screw-threaded in one direction, an abutment threaded upon said rod and held from movement relative thereto, an inner disk loosely mounted in contact with said abutment, an outer disk, packing means disposed between said disks, an adjustable member threaded upon the rod to engage the outer disk and compress the packing to compensate for wear, inwardly directed flanges from each of said disks, and a supporting member carried by said flanges at the inner face of said packing.

3. In a valve means of the class described, a cylinder, heads at the opposite ends thereof, a piston valve within the cylinder having a packing and a rod extending through one of said heads and capable of rotation, an adjustable member upon said rod adapted to compress the packing of said valve, and fixed means extended inward from one of the cylinder heads adapted to embrace and retain the adjustable member when brought into engagement therewith to permit compression of the packing upon rotation of the rod.

4. In a valve means of the class described, a cylinder, heads at the opposite ends thereof, a piston valve within the cylinder having a packing and a rod extending through one of said heads and capable of rotation, an adjustable member upon said rod adapted to compress the packing of said valve, and an inwardly projected apertured member forming a wrench hold adapted to receive and retain the adjustable member against rotation to permit the compression of the packing upon rotation of the rod.

5. In a valve means of the class described, a cylinder, heads at the opposite ends thereof, a rod disposed in the cylinder and mounted in one of said heads for reciprocatory and rotary movement, spaced pistons mounted upon said rod and comprising packings adapted to be compressed, adjusting means upon the rod for acting upon the compressible packing of each of the pistons and extending outwardly therefrom, and fixed means projecting inward from the cylinder heads and adapted to engage and retain either of the adjusting means upon a reciprocatory movement of the rod beyond its normal movement and to effect an adjustment of the packing by a rotative movement of said rod.

6. In valve means of the class described, in combination, a casing, a valve mounted therein and upon a rotatable member and comprising packing, and means on the casing adapted to be caused to cooperate with the valve to tighten the packing aforesaid when said member is rotated, substantially as described.

7. In valve means of the class described, in combination, a casing, a valve mounted therein and comprising packing, a wrench abutment on the casing, a valve rod for the valve, and a nut on the valve rod adapted to be moved into cooperation with the wrench abutment whereby relative movement of the rod and nut may be effected to tighten the packing of the valve, against the casing.

8. In valve means of the class described, in combination, a valve casing, a two-part valve mounted to move therein, an actuating rod for the valve, and means on the actuating rod adapted to be engaged with the casing to move the parts of the valve relatively to each other, and packing between the parts of the valve adapted to be adjusted by the movement of said parts.

9. In valve means of the class described, in combination, a casing, a valve movable longitudinally therein and comprising relatively movable parts, a packing between said parts, a rod for moving the valve in the casing, a nut on said rod adjustable to tighten the parts of the valve against the packing, and a member on said casing engageable with said nut to hold it stationary while the rod is turned to cause movement of the nut for the purpose specified.

In testimony whereof I affix my signature.

ANDREW A. McCREE.